(No Model.)
J. M. TODD.
WHEEL FENDER FOR CARRIAGES.
No. 332,022. Patented Dec. 8, 1885.
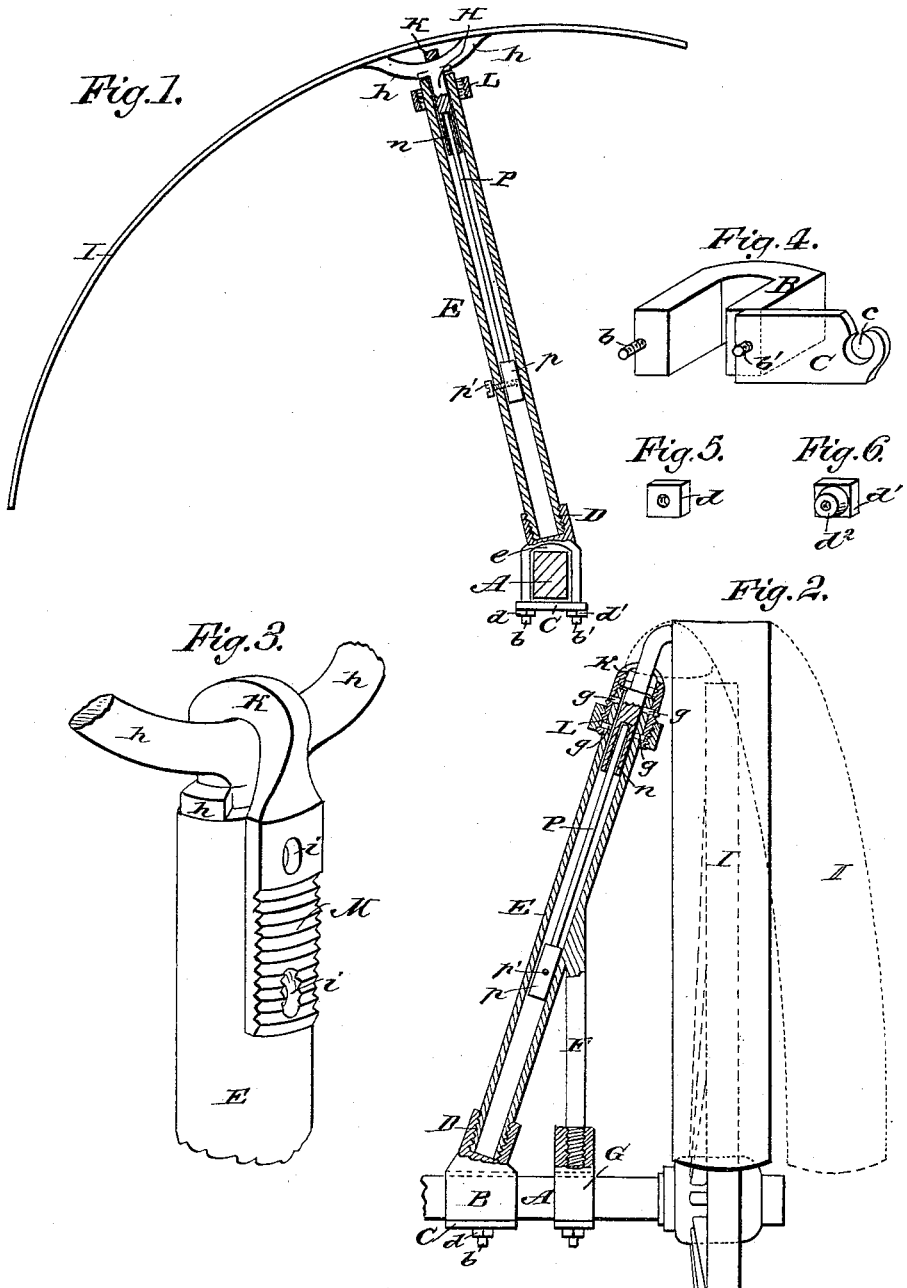
WITNESSES:
INVENTOR:
J. M. Todd
BY Munn & Co.
ATTORNEYS.

United States Patent Office.

JAMES M. TODD, OF ALBERT LEA, MINNESOTA.

WHEEL-FENDER FOR CARRIAGES.

SPECIFICATION forming part of Letters Patent No. 332,022, dated December 8, 1885.

Application filed May 1, 1885. Serial No. 164,114. (No model.)

*To all whom it may concern:*

Be it known that I, JAMES MARCUS TODD, of Albert Lea, in the county of Freeborn and State of Minnesota, have invented a new and useful Improvement in Wheel-Fenders for Carriages, of which the following is a full, clear, and exact description.

My invention relates to the guards that are attached to carriages to prevent the mud and dirt taken up by the wheels from being thrown upon the body of the carriage and its occupants; and it has for its object to provide a fender adapted to be partly rotated on its support when the forward axle turns on its king-bolt.

My invention consists of a movable or rotatable fender for the forward wheels of vehicles.

The invention also consists in the means for holding the fender to the carriage-axle and for providing for the movement of the fender.

The invention further consists in details of construction and combinations of parts, as will be hereinafter described and then claimed.

Reference is to be had to the accompanying drawings, forming a part of this specification, in which similar letters of reference indicate corresponding parts in all the figures.

Figure 1 is a side elevation of the fender and cross-section of a carriage-axle, the fender-support being in section. Fig. 2 is a rear elevation of the same, showing the support and brace in section and the carriage-axle and one wheel in part. Fig. 3 is a detail view, enlarged, of the upper part of the fender-support. Fig. 4 is a perspective view of the clasp for holding the support to the axle. Figs. 5 and 6 show the nuts for securing the clasp to the axle.

A indicates a portion of the forward axle of a vehicle, to which the support E of the fender I for the wheel is held by the clasp or clip B, brace F, and clasp G. The clasp B, as shown in Fig. 4, has the threaded studs $b\ b'$, projecting from the ends of its parallel arms, and on its cross-bar is formed the internally-threaded socket D, for receiving the lower threaded end of the tubular support E. The tie-plate C of the clasp B has at one end an aperture for one of the studs, $b'$, of the clasp B, and at its other end is formed with a larger aperture, $c$, opening into a recess in one side of the plate. An ordinary nut, $d$, is used on the stud $b'$, and a nut having a boss, $d^2$, adapted to fit in the aperture $c$ of the plate, is used on the other stud, $b$, whereby, when the nut $d$ is loosened and the nut $d'$ unscrewed so that its boss is free from the aperture $c$, the plate C can be swung on the stud $b'$, and the clasp B easily removed from or placed on the axle. The clasp B is made larger than the axle, to receive a rubber or other packing, $e$, between it and the axle, so that the said clip can be fitted to axles of any size, and this packing also serves to relieve the fender from the jar of the wheels. The support E is inclined from a vertical line, as shown, to bring its upper end near the periphery of the wheel. The brace F extends downward from the support E, and has its lower end secured in the socket of a clasp, G, similar in construction to the clasp B. A short shaft, H, forked at its outer end, fits loosely in the bore of the support E, and is held in the upper end of said support by a clip or staple, K, the ends of which clip are threaded on their outer faces to receive a threaded ring or nut, L. The ends of the clip K are provided with apertures $i$, into which studs $g$ on the support E enter, so that when the nut L is screwed over the ends of the clip K the clip will be held securely upon the support, and the shaft H can turn freely in the loop of the clip. Lugs $h$ on the sides of shaft H bear on the end of support E and limit the movement of the shaft by contact with the sides of the clip K. A spring-rod P in the support E has its upper end squared to fit a square socket, $n$, in the lower end of shaft H. The lower end of the rod P has an enlargement, $p$, and a set-screw, $p'$, passing through the support E into the enlargement $p$, prevents the rod P from turning. The fork $h$ of the shaft H is bent outward over the wheel, and to it the frame of the fender I is secured, which frame is covered with leather or other suitable material. When the forward axle turns on the king-bolt, the rear end of the fender will come against the side of the vehicle or a suitable guard thereon, and the shaft H, turning in the support E, will allow the fender to swing, as shown in dotted lines in Fig. 2, whereby tension will be put on the rod P. When the axle returns to its normal position, the resiliency of the rod P will swing the fender I back concentric with the rim of the wheel.

Having thus described my invention, I claim as new and desire to secure by Letters Patent—

1. The combination, with the forward axle of a vehicle, of a fender adapted to be rotated by the body of the vehicle when, by the swinging of the said axle upon the king-bolt, the fender is brought against the said body, as set forth.

2. The combination, with the forward axle of a vehicle, and with a support held thereon, of a shaft held to rotate in the outer end of said support and of a fender attached on said shaft, as set forth.

3. The combination, with the forward axle of a vehicle, and with a support held thereon, of a fender attached to a shaft held to rotate in the outer end of said support and of a spring for retaining the said shaft in its normal position, as set forth.

4. The combination, with the forward axle of a vehicle, of the support E, held thereon, the shaft H, held to turn in the outer end of the support and carrying the fender I, and of the rod P, held in the support E and to the shaft H, as set forth.

5. The combination, with the forward axle of a vehicle, of the support E, held thereon, the shaft H, carrying the fender, the clip K, and the rod P, attached to the shaft H and to the support E, as set forth.

6. The combination, with the axle A, of the fender-support E, having brace F, and of the clasps B and G, as set forth.

7. The combination, with the support E, attached to the axle of a vehicle, and provided with studs $g$, of the shaft H, carrying the fender and having lugs $h$, the clip K, having apertures $i$ and screw-threaded on the outer faces of its ends, and of the nut L, as set forth.

8. The combination, with a support held on the forward axle of a vehicle, and with a shaft held in the outer end of said support and carrying a fender, of the rod P, having one end held to said support and its other end held to said shaft, as set forth.

9. The combination, with the clasp B, having an internally-screw-threaded socket, D, and the studs $b\ b'$, of a tie-plate apertured at one end for a stud and having at its other end the aperture $c$, open at one side, and of the nuts $d\ d'$, as set forth.

10. The combination, with the fender-support E, axle A, and clasp B, of the rubber $e$, as set forth.

JAMES M. TODD.

Witnesses:
G. O. SUNDBY,
JAMES M. HENLEY.